United States Patent [19]
Heller et al.

[11] Patent Number: 6,012,101
[45] Date of Patent: Jan. 4, 2000

[54] COMPUTER NETWORK HAVING COMMONLY LOCATED COMPUTING SYSTEMS

[75] Inventors: Andrew Heller; Barry Thornton; Daniel Barrett, all of Austin; Charles Ely, Horseshoe Bay, all of Tex.

[73] Assignee: INT Labs, Inc., Austin, Tex.

[21] Appl. No.: 09/072,397

[22] Filed: May 4, 1998

Related U.S. Application Data

[60] Provisional application No. 60/071,604, Jan. 16, 1998.

[51] Int. Cl.[7] ................................................ G06F 13/00
[52] U.S. Cl. ................................. 709/250; 709/246
[58] Field of Search ........................... 395/200.8, 200.76, 395/200.69, 200.68; 345/125, 326; 709/250, 246, 239, 238

[56] References Cited

U.S. PATENT DOCUMENTS

| | | | |
|---|---|---|---|
| 3,725,866 | 4/1973 | Oldfield, Jr. et al. . | |
| 4,484,306 | 11/1984 | Kulczyckyj et al. . | |
| 5,150,243 | 9/1992 | Suzuki . | |
| 5,260,697 | 11/1993 | Barrett et al. | 345/173 |
| 5,337,413 | 8/1994 | Lui et al. | 710/2 |
| 5,347,167 | 9/1994 | Singh | 307/125 |
| 5,485,570 | 1/1996 | Busboom et al. . | |
| 5,499,377 | 3/1996 | Lee | 395/200.74 |
| 5,550,593 | 8/1996 | Nakabayashi . | |
| 5,557,775 | 9/1996 | Shedletsksy . | |
| 5,577,205 | 11/1996 | Hwang et al. | 361/683 |
| 5,598,401 | 1/1997 | Blackwell et al. . | |
| 5,675,811 | 10/1997 | Broedner et al. | 710/8 |
| 5,715,410 | 2/1998 | Kim | 710/129 |
| 5,734,834 | 3/1998 | Yoneyama | 395/200.56 |
| 5,748,890 | 5/1998 | Goldberg et al. . | |
| 5,801,689 | 9/1998 | Huntsman | 345/329 |
| 5,802,281 | 9/1998 | Clapp et al. | 395/200.58 |
| 5,831,608 | 11/1998 | Janay et al. | 345/334 |

*Primary Examiner*—Zarni Maung
*Attorney, Agent, or Firm*—Haynes & Boone, L.L.P.

[57] ABSTRACT

A computer network comprised of a plurality of interconnected nodes, each having a DTE device coupled thereto. Plural ones of the DTE devices are each further comprised of a computing system positioned at a first location and a human interface, which includes a video monitor, and plural I/O devices, specifically, a keyboard, mouse and printer, positioned at a second location remotely located relative to the first location. The first locations at which the computing systems of the DTE devices are positioned are commonly located. The DTE devices further include a first encoder coupled to the computing system, a first decoder coupled to the video monitor and the at least one I/O device and a transmission line which couples the encoder to the decoder. The first encoder receives, from the computing system, a video signal to be transmitted to the video monitor and a non-video signal to be transmitted to the at least one I/O device. The first encoder combines the video and the non-video signals into a combined signal and transmits the combined signal to the first decoder via the transmission line. The first decoder receives the combined signal, separates the video and non-video signals therefrom for respective propagation to the video monitor and the at least one I/O device.

35 Claims, 4 Drawing Sheets

COMPUTER NETWORK HAVING COMMONLY LOCATED COMPUTING SYSTEMS

CROSS-REFERENCE TO RELATED PROVISIONAL APPLICATION

This application claims the benefit of U.S. Provisional Patent Application Ser. No. 60/071,604, filed on Jan. 16, 1998.

CROSS-REFERENCE TO RELATED APPLICATIONS

This application is related to U.S. patent application Ser. No. 09/072,320 entitled COMPUTER SYSTEM HAVING REMOTELY LOCATED I/O DEVICES, U.S. Ser. No. 09/072,382 entitled METHOD FOR INCORPORATING COMPUTER DATA INTO AN ANALOG VIDEO STREAM AND AN ASSOCIATED COMPUTER SYSTEM HAVING REMOTELY LOCATED I/O DEVICES and U.S. Ser. No. 09/072,216 entitled COMPUTER NETWORK HAVING MULTIPLE REMOTELY LOCATED HUMAN INTERFACES SHARING A COMMON COMPUTING SYSTEM, all of which were filed on even date herewith, assigned to the Assignee of the present application and are hereby incorporated by reference as if reproduced in their entirety.

TECHNICAL FIELD

The invention relates generally to computer networks and, more particularly, to a computer network which includes plural commonly located computing systems as a portion thereof.

BACKGROUND OF THE INVENTION

In its broadest sense, a computer network is a set of nodes and communication channels which interconnect the set of nodes. The nodes may be computers, terminals, workstations, or communication units of various kinds and may be distributed at different locations. They communicate over the communication channels which are provided by the owner of the computer network or leased from a common carrier. These communication channels may use a variety of transmission media such as optical fibers, coaxial cable or twisted copper pairs. A local area network (or "LAN") is a computer network at a single site and, in many cases, is confined to a single building. A wide area network (or "WAN") is a computer network that uses either a public or private switching system to interconnect computers located at plural sites which may be separated by hundreds or thousands of miles.

There are a number of advantages to constructing a computer network. They include resource and data sharing, and communication and data exchange. Resource sharing provides users with convenient access to special computing resources, regardless of their physical location. Data sharing provides users with access to common databases. Data exchanges enable users to exchange data files while communication exchanges enable users to exchange messages, for example, via electronic mail (or "E-mail"). While networks may be arranged in a variety of configurations, a commonly used network design has a bus (also known as a "linear") topology in which a single network cable is routed through those locations where a data terminal equipment (or "DTE") device is to be connected to the network. At each of these locations, a physical connection (or "tap") is made to the cable to allow the DTE at that location to access the network. At selected nodes of such a network, file servers or other large scale computer systems provide network services while, at others of the nodes, individual workstations, each typically comprised of a personal computer (or "PC"), desktop computer, or other type of physically compact computer system capable of both operating as a standalone computer and accessing the network services, reside.

The components of PCs (as well as all other computer systems, including minicomputers and mainframes), may be divided into two functional units—the computing system and the human interface (or "HI") to the computing system. For a PC, the computing system is, quite simply, the chassis which holds the motherboard, power supply, hard drive and the like. The human interface, on the other hand, are those devices that humans use to transfer information to and/or receive information from the computing system. The most commonly recognized devices which form part of the human interface with the computing system include the monitor, keyboard, mouse and printer. Of course, a variety of other devices, for example, a joystick, trackball, touchpad or others too numerous to specifically mention, may form part of the human interface. For most PCs installed at workstations, the computer monitor, keyboard and mouse rest on the desktop while the computer chassis which holds the computing system rests on the floor underneath the desktop.

While the above-described network configuration is quite common in many business establishments, recently, a number of issues, in particular, security concerns, have been raised in connection with such network designs. Business contacts, vendor information, contracts, reports, compilations, proprietary software, access codes, protocols, correspondence, account records, business plans are just some of the fundamental assets of a company which are oftentimes accessible from an employee's computer where it can be quickly copied onto a floppy disk and stolen.

Disk and CD drives may also be used to introduce illegal, inappropriate or dangerous software to a computer. Storing bootlegged software can expose a company to copyright infringement claims. Computer games often reduce employee productivity. If imported onto a computer system, computer pornography may create a hostile work environment which leads to a sexual discrimination lawsuit against the company. Computer viruses can cause the loss of critical information stored on a computer. Finally, the computing system itself may be damaged or otherwise misconfigured when left accessible to technically oriented employees who take it upon themselves to attempt to repair and/or modify the computer system.

Another concern often raised in connection with the present practice of placing the computer system at the desktop is that such workstation designs actual work against proper maintenance of the computing system. When placed underneath the desktop, computing systems are often forced to absorb physical shocks when accidentally kicked, knocked over or struck by falling objects, any of which could result in damage to the various electronic components, located within the chassis, which comprises the computing system. Oftentimes, a computing system is placed in a "convenient" location and not in a location designed to keep it cool. A computer system typically includes a cyclonic fan designed to direct a constant flow of cooling area at the heat-generating components of the computing system. However, if a barrier is placed a few inches in front of the fan intake, the efficiency of the fan is reduced dramatically. Similarly, placing the computer system against a wall or running cables in front of the fan adversely affects the ability of the fan to properly cool the computing system. Finally, even in relatively clean office environments, the fan tends to draw in dirt and other dust particles into the interior of the computer chassis where they are deposited on the heat-generating electronic components which comprise the computing system. As dust tends to insulate the components on which it is deposited, the ability of such components to dissipate heat becomes degraded when a layer of dust collects on the component.

Logistical support, too, becomes a vexing problem for computer-intensive organizations when computing systems are scattered throughout a facility. When machine failures occur, the repair person must go to the machine to diagnose and repair the machine. Oftentimes, this entails multiple visits to the machine's location, particularly when the first examination reveals that replacement parts or a replacement machine are needed. Similarly, software upgrades and other performance checks become quite time-consuming tasks when personnel must travel to each machine where the software resides locally.

Finally, many office buildings were designed before the advent of the age of the PC. As a single PC can consume over 300 watts of power, a heavily computerized workplace could potentially demand power in excess of the amount available. Similarly, the heat generated by the large number of computers installed in modern workplaces can easily overwhelm the air conditioning capacity of a building's HVAC system, thereby causing room temperatures to rise above those levels preferred by the occupants of the building.

These concerns have been driving the development of the network computer (or "NC") and other so-called "thin" computer solutions. While various NC designs have been proposed, most entail removal of the auxiliary memory (also known as the hard drive) and substantially reducing the size of the processor. All software applications and data files would be stored on the network and the NC would be limited to accesses of network software and data files. Most NC designs also propose that all disk drives (typically, the CD and floppy drives) be removed, thereby eliminating the ability of the NC user to import or export software applications and/or data files.

The development of the NC is, in part due to a recognition by the computer industry of security and other problems which have arisen due to the evolution of computer networks into their present configuration. However, the NC is not a fully satisfactory solution to these problems. While removing much of the processing capability from the workstation, most NC designs propose leaving sufficient intelligence at the workstation to access the internet, load software applications retrieved from the network memory and perform other operations. Thus, while reduced in complexity, NCs will still have maintenance, power and cooling concerns. Thus, while the NC represents a step in the right direction, many of the aforementioned issues cannot be resolved by wide-scale implementation of NCs.

In order to fully resolve the aforementioned issues, the entire computing system needs to be physically separated from the human interface, specifically, by keeping the human interface (monitor, keyboard, mouse and printer) at the workstation while relocating the associated computing system (chassis holding the motherboard, power supply, memory, disk drives, etc.) to a secured computer room where plural computing systems are maintained. By securing the computing systems in one room, the employer's control over the computer systems would be greatly enhanced. For example, since employees would no longer have personal access, through the floppy or CD drive, to the memory subsystem, employees could not surreptitiously remove information from their computing system. Nor could the employee independently load software or other data files onto their computing system. Similarly, the employee could no longer physically change settings or otherwise modify the hardware portion of the computer. Maintenance would be greatly facilitated by placement of all of the computing systems in a common room. For example, the repair technicians and their equipment could be stationed in the same room with all of the computing systems. Thus, a technician could replace failed components or even swap out the entire unit without making repeated trips to the location of the malfunctioning machine. Such a room could be provided with special HVAC and power systems to ensure that the room is kept clean, cool and fully powered.

Therefore, what is needed is a computer network comprised of plural computers, each configured such that a human interface portion thereof is remotely located relative to a computing system portion thereof, in which plural computing systems are located at a common location.

SUMMARY OF THE INVENTION

In one embodiment, the present invention is of a computer network comprised of a plurality of interconnected nodes, each having a DTE device coupled thereto. At least one, and preferably, plural ones, of the DTE devices are each further comprised of a computing system positioned at a first location, preferably common to the plural computing systems, and a human interface positioned at a second location remotely located relative to the first location. A 4-wire cable couples first and second interface devices which, in turn, are respectively coupled to the computing system and the human interface. The first interface device converts signals generated by the computing system into a format suitable for transmission to the second interface device while the second interface device converts signals, received from the first interface device into a format suitable for transmission to the human interface. In alternate aspects thereof, the computer network may further include a cable, preferably, a thin wire coaxial cable, for interconnecting the plural nodes, the computing system may be a computer chassis and at least one computing system component housed therein and coupled to the first interface device and the human interface may be a video monitor, printer, keyboard or mouse coupled to the second interface device.

In another embodiment, the present invention is of a computer network comprised of a plurality of interconnected nodes, each having a DTE device coupled thereto. At least one, and preferably, plural ones, of the DTE devices are each further comprised of a computing system positioned at a first location, preferably common to the plural computing systems, and a human interface, which includes a video monitor and at least one I/O device, positioned at a second location remotely located relative to the first location. The DTE device further includes a first encoder coupled to the computing system, a first decoder coupled to the video monitor and the at least one I/O device and a transmission line which couples the encoder to the decoder. The first encoder receives, from the computing system, a video signal to be transmitted to the video monitor and a non-video signal to be transmitted to the at least one I/O device. The first encoder combines the video and the non-video signals into a combined signal and transmits the combined signal to the first decoder via the transmission line. The first decoder receives the combined signal, separates the video and non-video signals therefrom for respective propagation to the video monitor and the at least one I/O device.

In one aspect thereof, the computer may further include a second encoder coupled to the computing system and the first encoder and a second decoder coupled to the first decoder and the I/O devices. The second encoder receives a first non-video signal to be transmitted to a first I/O device, a second non-video signal to be transmitted to a second I/O device and a third non-video signal to be transmitted to a third I/O device and combines the first, second and third non-video signals into the non-video signal. The second decoder receives the non-video signal from the first decoder and separates the first, second and third non-video signals therefrom for respective propagation to the first, second and third I/O devices. In a further aspect thereof, the first encoder may receive red ("R"), green ("G"), blue ("B"), horizontal synchronization ("HSYNC") and vertical synchronization ("VSYNC") video signals from the computing system, combine the R and HSYNC video signals into a combined signal for transmission to the first decoder, combine the B and VSYNC video signals into another combined signal for transmission to the first decoder and combine the G video signal and the non-video signal into the last combined signal for transmission to the first decoder.

In still another embodiment, the present invention is of a computer network comprised of a plurality of nodes, each having a DTE device coupled thereto, and a connective structure arranged, for example, in a bus topology, which interconnects the plural DTE devices into a computer network. The DTE device coupled to at least one, and preferably, plural ones, of the nodes, further comprises a computing system located at a first location, preferably common to the plural computing systems, for example, a shared computer room or a common support structure such as a rack, a human interface located at a second location, each remotely located relative to the first location and preferably remotely located relative to the other second locations, a first interface device coupled to the computing system, a second interface device coupled to a monitor and an I/O device of the human interface and a 4-wire cable coupling the first and second interface devices. An encoding circuit of the first interface device receives, from the computing system, plural video signals to be transmitted to the video monitor and a non-video output signal to be transmitted to the I/O device. The encoding circuit combines the non-video signal with a selected one of the plural video signals to produce a combined signal and transmits the combined signal over a selected pair of the transmission lines of the 4-wire cable. A decoding circuit of the second interface device receives the combined signal from the first interface device and separates the combined signal into the video signal to be transmitted to the video monitor and the non-video signal to be transmitted to the I/O device.

In one aspect thereof, an encoding circuit of the second interface device receives a non-video input signal from the I/O device and encodes the received signal for output onto a selected pair of the transmission lines for transfer to the first interface device. In another aspect thereof, a decoding circuit of the first interface device receives the non-video I/O input signal from the selected pair of transmission lines and decodes the non-video input signal for transmission to the computing system.

DETAILED DESCRIPTION OF THE PREFERRED EMBODIMENT

Figure 1:
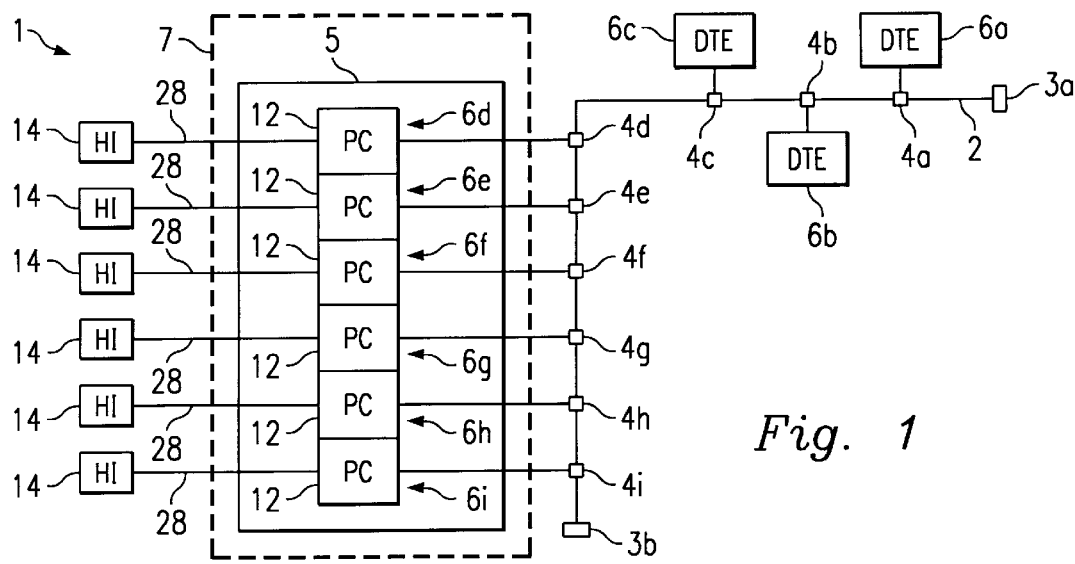
FIG. 1 is a block diagram of a computer network constructed in accordance with the teachings of the present invention.

Referring now to FIG. 1, a computer network 1 constructed in accordance with the teachings of the present invention will now be described in greater detail. The computer network 1 has a bus topology and is comprised of a network cable 2 which extends between terminators 3a and 3b. It should be noted, however, that ring, star, hub and other network topologies are equally suitable for use as the network topology. As illustrated herein, the network cable 2 is comprised of "thin wire" coaxial cable. It should be noted, however, that the transmission medium used for the network cable 2 will vary depending on the specific design of the computer network 1. If the network cable 2 can be kept shorter than 100 meters, it may be possible to use a twisted pair as the network cable 2. For greater distances, the network cable should be comprised of either thin wire or "thick wire" coaxial cable. Thin wire coaxial cable has a diameter of 0.25 inches, half that of thick wire coaxial cable. Thick wire cable also requires the use of additional wiring commonly known as "drop cable" and transmit and receive electronics between each tap on the main coaxial cable and the point of attachment to each workstation. As a result, therefore, thin wire coaxial cable is both easier to use and less expensive to install. However, as thin wire has much higher attenuation rates, it is often necessary to use thick wire cable for certain portions of the network cable 2, for example, when interconnecting thin-wire segments located in different areas of a building.

Spaced along the network cable 2 are a series of nodes 4a through 4i. At each node 4a through 4i, a physical connection couples a corresponding one of the DTE devices 6a through 6i to the network cable 2 such that the DTE devices 6a through 6i may access other portions of the computer network 1. In the embodiment of the invention disclosed herein, it is contemplated that each of the DTE devices 6a through 6c are file servers or other type of network resources while each of the DTE devices 6d through 6i are PCs, specifically PCs comprised of a computing system 12 coupled to a remotely located human interface 14. As further illustrated in FIG. 1, the computing systems 12 are commonly located. For example, the computing systems 12 may be mounted in a common support structure 5 such as a rack located in a room 7 shown in phantom in FIG. 1. As disclosed herein, the term "commonly located" computing systems shall mean computing systems which are positioned or otherwise located within 10 meters of each other. Furthermore, other types of support structures are equally suitable for the uses contemplated herein.

Various benefits are achieved by configuring the computer network 1 to include plural DTE devices, specifically the DTE devices 6d through 6i, each comprised of a commonly located computing system 12 for which the human interface 14 is remotely located relative to the corresponding computing system 12. Specifically, it is well appreciated in the art that the various DTE devices which comprise a computer network are typically geographically scattered throughout a building or other complex, thereby leading to the maintenance, repair and, if the users of the DTE devices have access to network facilities via a floppy drive or other device, security problems discussed herein. All of these problems may be readily eliminated by housing all of the computing systems 12 in one or more support structures 5 which, in turn, may be located in a secured, limited access computer room 7 specially designed to meet the power and cooling requirements for the collection of commonly located computing systems 12.

The computer network 1, itself, is much more compact (and much less geographically extensive) when the computing systems 12 for the DTE devices 6d through 6i are commonly located. Thus, ease of maintenance for the computer network 1 may be enhanced. Furthermore, the cabling requirements for the computer network 1 may be greatly simplified. For example, most computer networks will include sections which use the more expensive thick wire coaxial cable. If various ones of the DTE devices have commonly located computing systems, the length of cable needed to wire the computer network 1 will be reduced considerably and larger portions of the computer network 1 will be suited for thin wire coaxial cable. For example, if the DTE devices 6a through 6c (the file server and other network facilities) are housed in the same room as the DTE devices 6d through 6i having the commonly located computing systems 12, a thin wire coaxial cable may be suitable for use as the network cable 2 for the entire computer network 1. If so, the cost of installing the computer network 1 will be reduced substantially.

Figure 2:
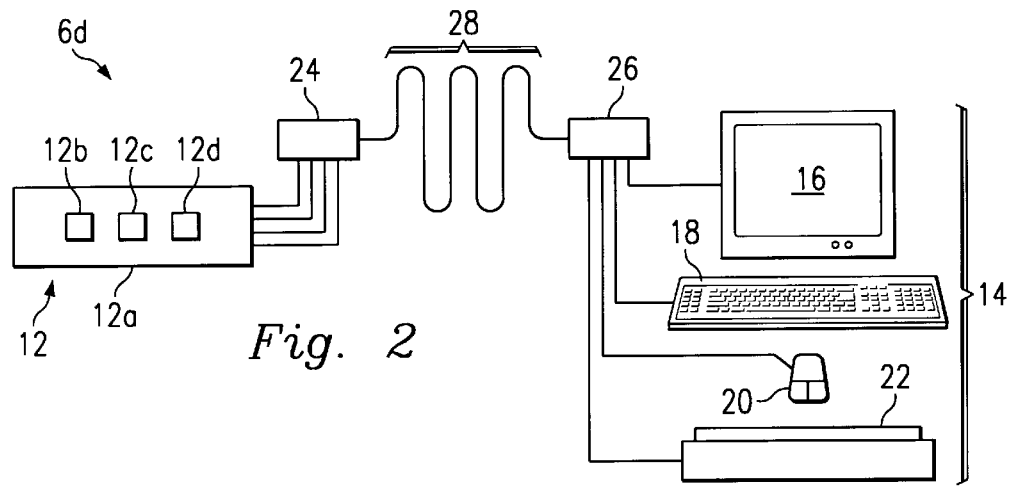
FIG. 2 is an expanded block diagram of a DTE forming part of the computer network of FIG. 1.

Referring next to FIG. 2, the computing system 12 and human interface 14 which, in combination, respectively comprise each of the DTE devices 6d through 6i may now be seen in greater detail. As may now be seen, the computing system 12 of each DTE device 6d through 6i is comprised of a computer chassis 12a, sometimes referred to as the "box" in which motherboard 12b, disk drive 12c, hard drive 12d, power supply (not shown) and other conventional components, are housed. As may now be further seen, the human interface 14 of each one of the DTE devices 6d through 6i is comprised of a monitor 16, a keyboard 18, a mouse 20 and a printer 22, all of which are conventional devices, the operation of which are well known. It should be clearly understood that the disclosed human interface 14 is given by way of example. Accordingly, it is fully contemplated that other input/output (or "I/O") devices, for example, a joystick, trackball, touchpad or other device may be included as part of the human interface 14. Generally, for inclusion in the human interface 14, an I/O device should require, at a minimum, some type of physical interaction with a human during the primary operation thereof. It should also be understood that not all I/O devices form part of the human interface. For example, the primary interaction which occurs during use of a floppy or CD drive is between the computing system and a physical medium inserted into the drive. Accordingly, floppy and CD drives are not part of the human interface 14.

In a conventionally configured computer system, the monitor 16, the keyboard 18, the mouse 20 and the printer 22 would be provided with a respective cable which terminates in a pin connectors which, when inserted into a matching plug connector provided on a rear side surface (or "backplane") of the computing system 12, couples the monitor 16, the keyboard 18, the mouse 20 and the printer 22 to the main system bus (not shown) which couples the various electronic devices (including, but not limited to the motherboard 12b, the disk drive 12c and the hard drive 12d) which comprises the computing system 12. Unlike the conventionally configured computer system, however, the monitor 16, the keyboard 18, the mouse 20 and the printer 22 are remotely located relative to the computing system 12. To enjoy the benefits of a remotely located human interface 14 as described herein, it is generally contemplated that the computing system 12 and the human interface 14 be located in separate rooms, which typically requires a minimum separation of at least 10 feet. It is specifically contemplated, however, that the computing system 12 and the human interface 14 may be located hundreds, or even thousands, of feet apart.

Thus, by the term "remotely located", it is intended to refer to separation distances greater than those possible using conventionally designed cables such as those provided when purchasing a PC. Accordingly, the term "remotely located", as used herein, generally refers to separation distances between 10 and 1,000 feet. However, as it is possible to utilize the disclosed techniques to separate the computing system 12 and the human interface 14 by distances greater than 1,000 feet, it should be clearly understood that the aforementioned upper limit of 1,000 feet is given by way of example and should not be construed as a limitation on the scope of the present invention.

To achieve the separation distances contemplated herein, an upstream extension interface 24 is coupled to the computing system 12 and a downstream extension interface 26 is coupled to the human interface 14. Generally, connector cables extending from the monitor 16, the keyboard 18, the mouse 20 and the printer 22 all plug into the downstream extension interface 26 in an manner identical to how those same cables would plug into the backplane of the computing system 12. Similarly, the cables extending from the upstream extension interface 24 identically plug into the backplane of the computing system 12 as would the cables from the monitor 16, the keyboard 18, the mouse 20 and the printer 22 plug thereinto. Finally, coupling the upstream extension interface 24 and the downstream extension interface 26 is a 4-wire cable 28 configured in the manner disclosed in co-pending U.S. patent application Ser. No. 08/674,626 filed Jul. 3, 1996 entitled "Method and Apparatus for Enabling the Transmission of Multiple Wide Band Width Electrical Signals, assigned to the Assignee of the present application and hereby incorporated by reference as if reproduced in its entirety.

Figure 3:
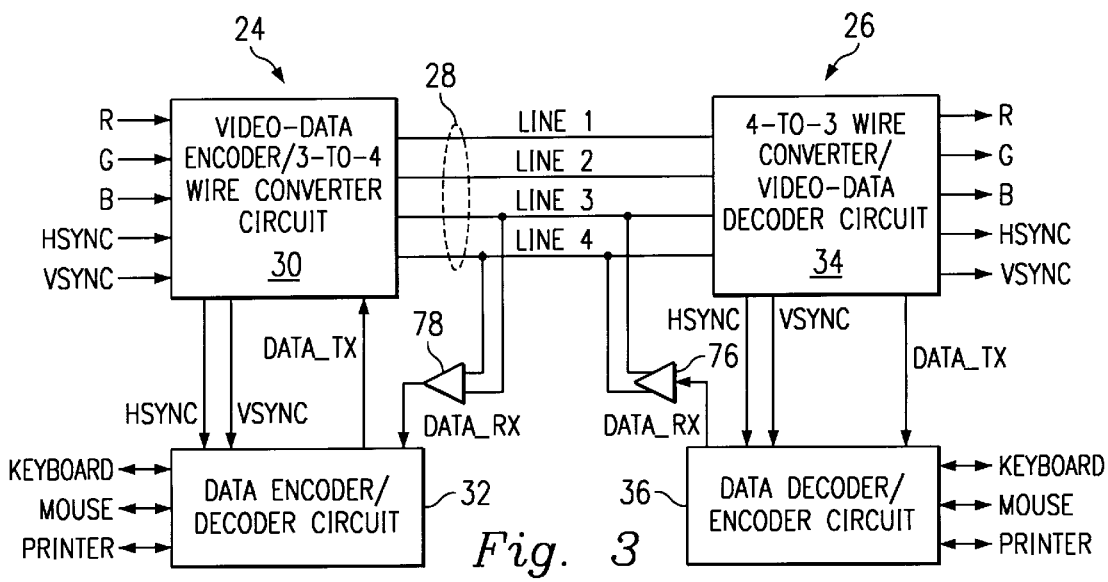
FIG. 3 is an expanded block diagram of upstream extension and downstream extension interfaces of the DTE of FIG. 2.

Referring next to FIG. 3, the upstream and downstream extension interfaces 24 and 26 will now be described in greater detail. As may now be seen, the upstream extension interface 24 is comprised of a video-data encoder/3-to-4 wire converter circuit 30 and a data encoder/decoder circuit 32. Similarly, the downstream extension interface 26 is comprised of a 4-to-3 wire converter/video-data decoder circuit 34 and a data decoder/encoder circuit 36. Broadly speaking, the video-data encoder/3-to-4 wire converter circuit 30 receives video signals output by the computing system 12 for transmission to the monitor 16, specifically, red (or "R"), green (or "G"), blue (or "B"), horizontal synchronization (or "HSYNC") and vertical synchronization (or "VSYNC") signals. The data encoder/decoder circuit 32, on the other hand, receives all signals output by the computing system 12 for transmission to the keyboard 18, the mouse 20 and the printer 22. The data encoder/decoder circuit 32 also receives the HSYNC and VSYNC signals from the video-data encoder/3-to-4 wire converter circuit 30 and, as will be more fully described below, uses the HSYNC and VSYNC signals to encode data received from the computing system 12 into a data signal DATA_TX for transmission to the video-data encoder/3-to-4 wire converter circuit 30.

Figure 4:
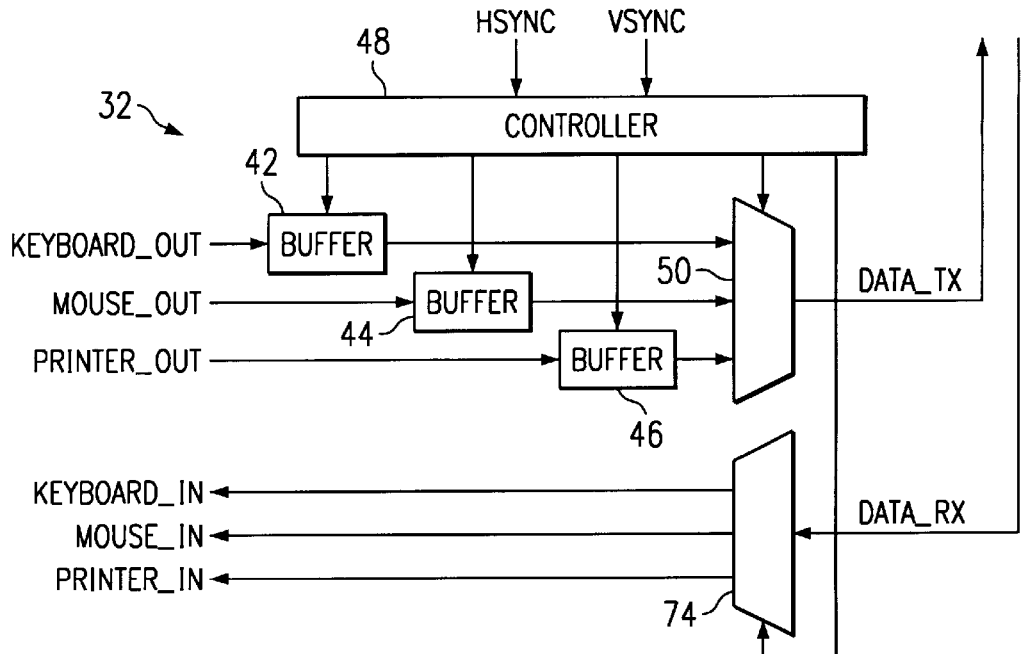
FIG. 4 is an expanded block diagram of a data encoder/decoder circuit of the upstream extension interface of FIG. 3.

Referring next to FIG. 4, operation of the data encoder/decoder circuit 32 in producing the data signal DATA_TX will now be described in greater detail. As is well known in the art, the computing system 12 generates signals to be transmitted to the various I/O devices included as part of the human interface 14. As shown here, the computing system 12 generates KEYBOARD_OUT, MOUSE_OUT and PRINTER_OUT signals for respective propagation to the keyboard 18, the mouse 20 and the printer 22. Each of the output signals KEYBOARD_OUT, MOUSE_OUT and PRINTER_OUT are propagated to a respective buffer 42, 44 and 46 where the received data is held temporarily. The buffers 42, 44 and 46 each include an output tied to a respective input of 3:1 multiplexer 50, the output of which is the DATA_TX signal. The buffers 42, 44 and 46 and the multiplexer 50 are controlled by a controller 48. Specifically, respective control outputs of the controller 48 are tied to a control input of each of the buffers 42, 44 and 46 and to a control input of the multiplexer 50.

The controller 48 times the propagation of the KEYBOARD_OUT, MOUSE_OUT and PRINTER_OUT signals such that the combined signal DATA_TX contains data only during the horizontal and vertical blanking pulses of the video signal being transmitted to the video-date encoder/3-to-4 wire converter circuit 30. To do so, the controller 48 receives the HSYNC and VSYNC signals from the video-data encoder/3-to-4-wire converter circuit 30. The controller 48 counts the blanking pulses contained in the HSYNC and VSYNC signals, and, during each such blanking pulse of the HSYNC and VSYNC signals, enables a selected one of the buffers 42, 44 and 46 and enables the multiplexer 50 such that the data stored in the selected buffer 42, 44 or 46 is propagated to the video-data encoder/3-to-4 wire converter circuit 30 as part of the DATA_TX signal. For example, each time the video signal transmitted to the video-data encoder/3-to-4 wire converter circuit 30 completes a line of video data, the HSYNC signal will contain a blanking pulse. The number of lines required to generate an image that fills the screen of the video monitor 16 will vary, depending on the operating mode of the video monitor 16. In accordance with one such operating mode, 640 lines of video data are required to generate a image. Thus, for this operating mode, the HSYNC signal will blank 640 times. Each blanking pulse is assigned to an output signal destined for a particular I/O device. For example, during horizontal blanking pulses 1–25, the controller 48 propagates data received from the KEYBOARD_OUT line to the video-data encoder/3-to-4 wire converter circuit 30 by enabling the buffer 42 and the multiplexer 50. During horizontal blanking pulses 26–50, the controller 48 propagates data received from the MOUSE_OUT line to the video-data encoder/3-to-4 wire converter circuit 30 by enabling the buffer 44 and the multiplexer 50. Finally, during horizontal blanking pulses 51–640, the controller 48 propagates data received from the PRINTER_OUT line to the video-data encoder/3-to-4 wire converter circuit 30 by enabling the buffer 46 and the multiplexer 50.

It has been discovered that all output signals respectively generated by the computing system 12 for the keyboard 18 and the mouse 20 may be readily contained within the time consumed by 25 blanking pulses. Furthermore, the 590 blanking pulses assigned for the transmission of output signals from the computing system 12 to the printer 22 is more than sufficient for containing all of the output signals generated by the computing system 12 for the printer 22 and that a number of these blanking pulses may be reassigned to support additional I/O devices. Finally, still more I/O devices may be supported by placement of output signals generated by the computing system 12 into the vertical blanking pulses contained in the VSYNC signal which occur each time a screen is scanned.

It is contemplated that the controller 48 performs the disclosed combining of the KEYBOARD_OUT, MOUSE_OUT and PRINTER_OUT signals into a combined output signal encoded such that all of the data occurs during the horizontal and vertical blanking pulses by executing an algorithm, set forth in microcode maintained and executed by the controller 48. It should be noted that some I/O devices may have multiple output lines instead of the single output line illustrated in FIG. 4 for each of the keyboard 18, mouse 20 and printer 22. For such devices, it is contemplated that the data encoder/decoder circuit 32 should be provided with additional circuitry and/or control signals which combines the multiple output lines into a single output signal. For example, the multiple output lines corresponding to a particular I/O device could be propagated to discrete locations within the buffer 42, 44 or 46 assigned to that I/O device. The microcode which enables the data held into the buffer to be propagated along the DATA_TX line could then be modified so that signals from the different output lines corresponding to a single I/O device could be transmitted during different ones of the blanking pulses assigned to that device.

Figure 6:
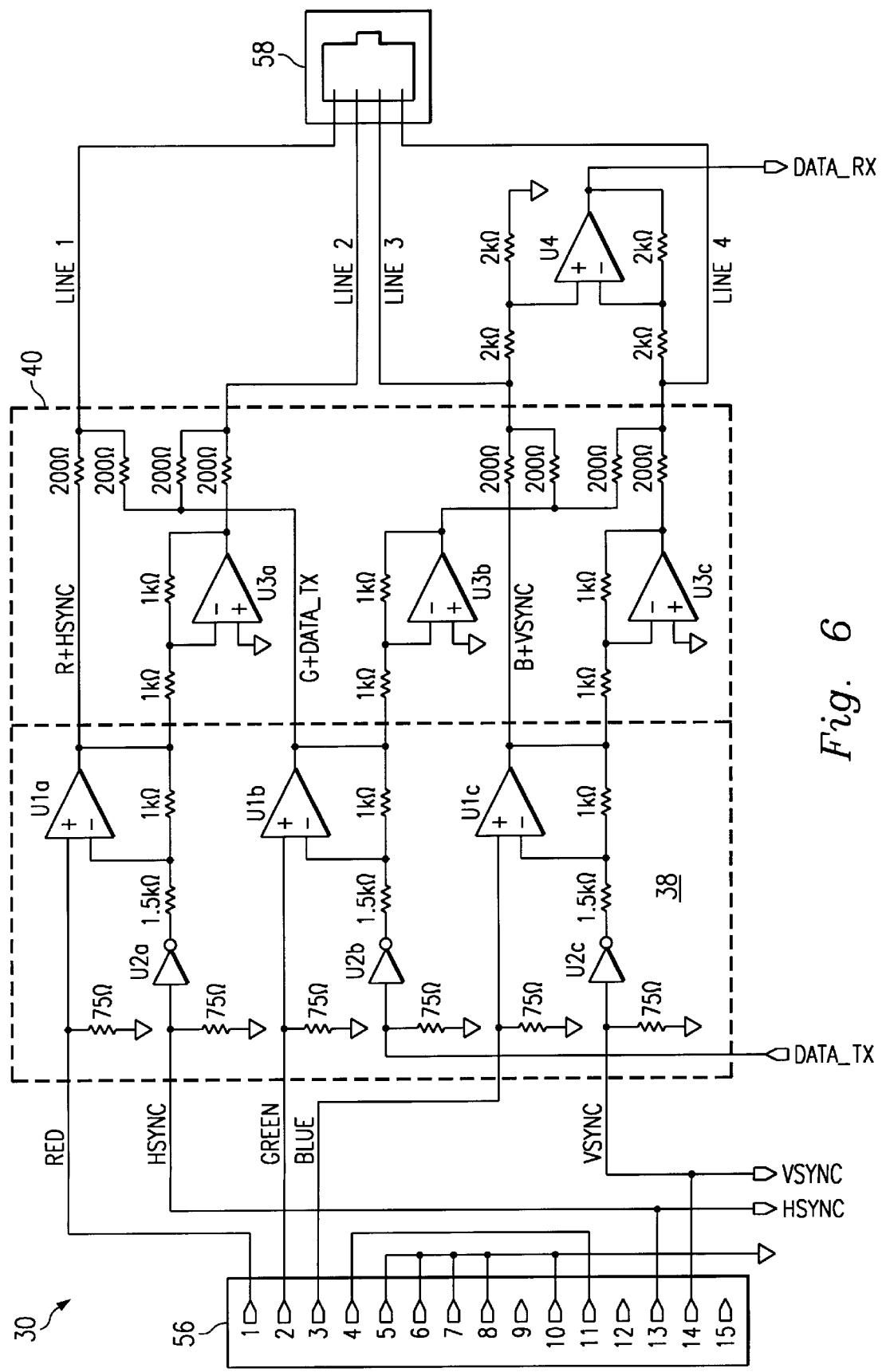
FIG. 6 is a circuit diagram illustrating a video-data encoder/3-to-4 wire converter circuit of the upstream extension interface of FIG. 3.

Referring next to FIG. 6, the video-data encoder/3-to-4 wire converter circuit 30 which receives the DATA_TX signal from the data encoder/decoder circuit 32 is comprised of an encoder circuit 38 coupled to a 3-to-4 wire converter circuit 40. Input to the encoder circuit 38 are the R, G, B, HSYNC, VSYNC and DATA_TX signals. The encoder circuit 38 is similar in construction to the encoder circuit described and illustrated in U.S. patent application Ser. No. 08/935,968 filed Sep. 23, 1997 entitled "Video Data Transmission and Display System and Associated Methods for Encoding/Decoding Synchronization Information and Video Data, assigned to the Assignee of the present invention and hereby incorporated by reference as if reproduced in its entirety. Specifically, operational amplifier U1a combines the R and HSYNC signals into a first combined signal R+HSYNC and operational amplifier U1c combines the B and VSYNC signals into a second combined signal B+VSYNC. In Ser. No. 08/935,968, the disclosed system was configured such that the G signal passed through the encoder unchanged. Here, however, the encoder circuit 38 is constructed to include operational amplifier U1b which combines the G and DATA_TX signals into a third combined signal G+DATA_TX. As data received from the computing system 12 and encoded by the data encoder/decoder circuit 32 into the DATA_TX signal is timed such that the data coincides with the blanking period for the G signal, the G and DATA_TX signals may be combined using a circuit identical to the circuits used to combine the R and HSYNC signals and to combine the B and VSYNC signals.

The R+HSYNC, B+VSYNC and G+DATA_TX signals output the encoder circuit 38 are transmitted to the 3-to-4 line converter circuit 40 where the three signals are placed on lines 1–4 of the 4-wire cable 28 for balanced-mode transmission to the human interface 14. The 3-to-4 wire converter 40 operates as described in co-pending U.S. patent application Ser. No. 08/674,626 filed Jul. 3, 1996 and previously incorporated by reference. Specifically, (R+HSYNC)+ and (G+DATA_TX)+ are placed on line 1, (R+HSYNC)– and (G+DATA_TX)+ are placed on line 2, (B+VSYNC)+ and (G+DATA_TX)– are placed on line 3 and (B+VSYNC)– and (G+DATA_TX)– are placed on line 4 of the 4-wire cable 28 for balanced mode transmission to the 4-to-3 wire converter/video-data decoder circuit 34.

Figure 7:
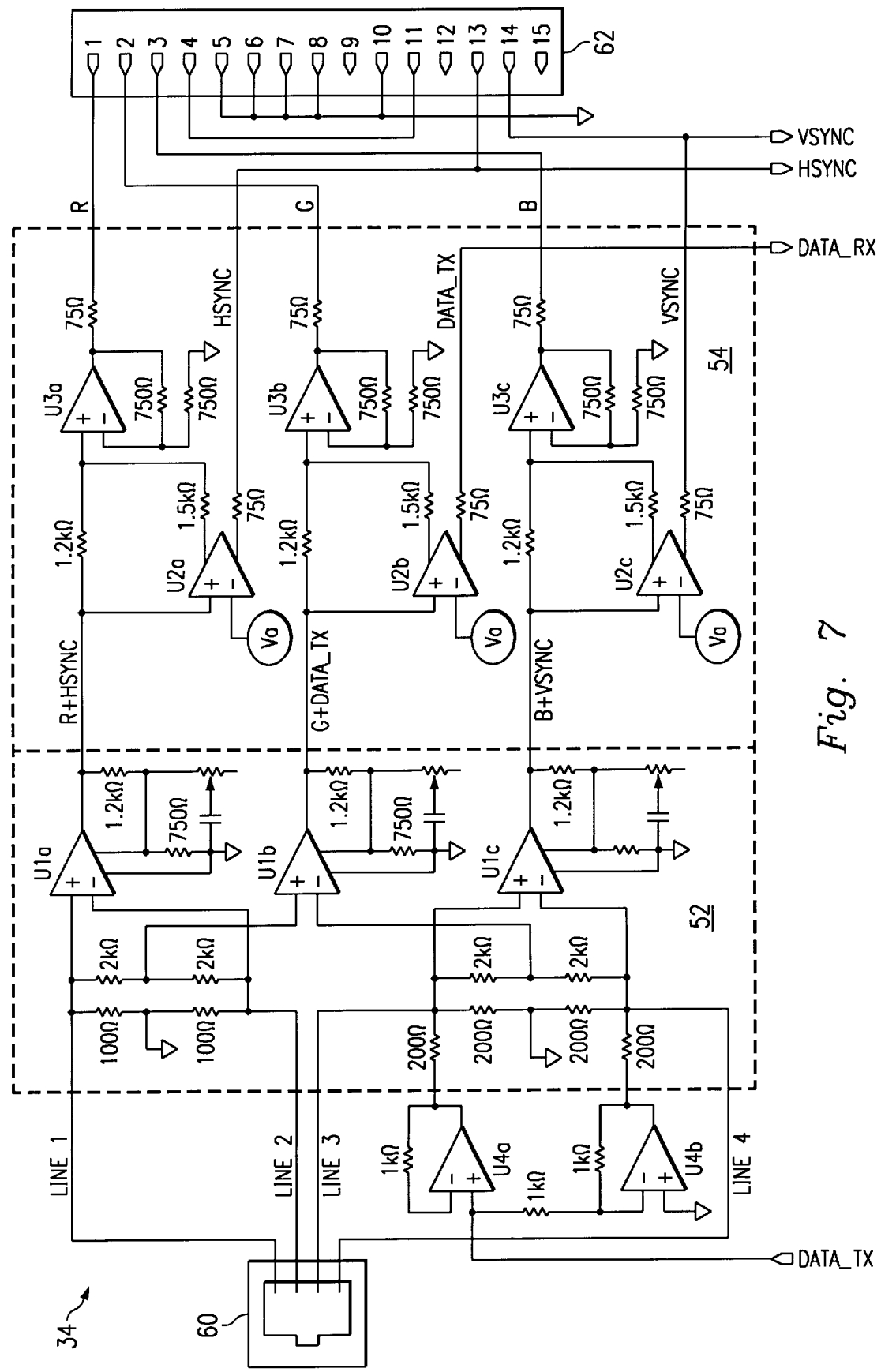
FIG. 7 is a circuit diagram illustrating a video-data decoder/4-to-3 wire converter of the downstream extension interface of FIG. 3

Referring next to FIG. 7, the 4-to-3 wire converter/video-data decoder circuit 34 which receives the aforementioned video signals from the videodata encoder/3-to-4 wire converter circuit 30 along transmission lines 1–4 is comprised of a 4-to-3 converter 52 coupled to a decoder circuit 54. Input to the 4-to-3 converter 52 are the video signals transmitted along lines 1–4. In the manner more fully described in co-pending U.S. patent application Ser. No. 08/674,626 filed Jul. 3, 1996 and previously incorporated by reference, the output of operational amplifier U1a is the R+HSYNC signal, the output of operational amplifier U1b is the G+DATA_TX signal and the output of operational amplifier U1c is the B+VSYNC signal. The R+HSYNC, G+DATA and B+VSYNC signals are propagated from the 4-to-3 converter 52 to the decoder circuit 54. There, in the manner more fully described co-pending U.S. patent application Ser. No. 08/935,968 filed Sep. 23, 1997 and previously incorporated by reference, the output of operational amplifier U3a is the R signal, the output of the operational amplifier U2a is the HSYNC signal, the output of the operational amplifier U3c is the B signal and the output of operational amplifier U2c is the VSYNC signal. In Ser. No. 08/935,968, the disclosed system was configured such that the G signal passed through the decoder unchanged. Here, however, the decoder circuit 54 is constructed to include operational amplifiers U3b and U2b, the outputs of which are the G and DATA_TX signals, respectively.

It is an important aspect of the invention that the encoded video-data signal may be transmitted over the relatively inexpensive 4-wire transmission line used to connect telephones to a telecommunications network such as the public switched telephone network (or "PSTN"). As a result, therefore, the cost of cabling the DTE devices 6d through 6i such that the human interfaces 14 are located between 10 and 1,000 feet from the computing systems 12 is significantly reduced, particularly as the separation distance between the two is increased. Furthermore, the connection requirements for the video-data encoder/3-to-4 wire converter circuit 30 and the 4-to-3 wire converter/video-data decoder circuit 34 are significantly simplified. For example, while the input connector 56 which couples the encoder circuit 38 to cables extending from the computing system is a 15 pin video connector, the output connector 58 which couples the 3-to-4 wire converter 40 to the 4-wire cable 28 is a very inexpensive RJ-11 jack best known for its use as a telephone jack. Similarly, the input connector 60 which couples the 4-to-3 wire converter 52 to the 4-wire cable 28 is another very inexpensive RJ-11 jack while the output connecter 62 which couples the decoder circuit 54 to the monitor 16 is another 15 pin video connector.

Figure 5:
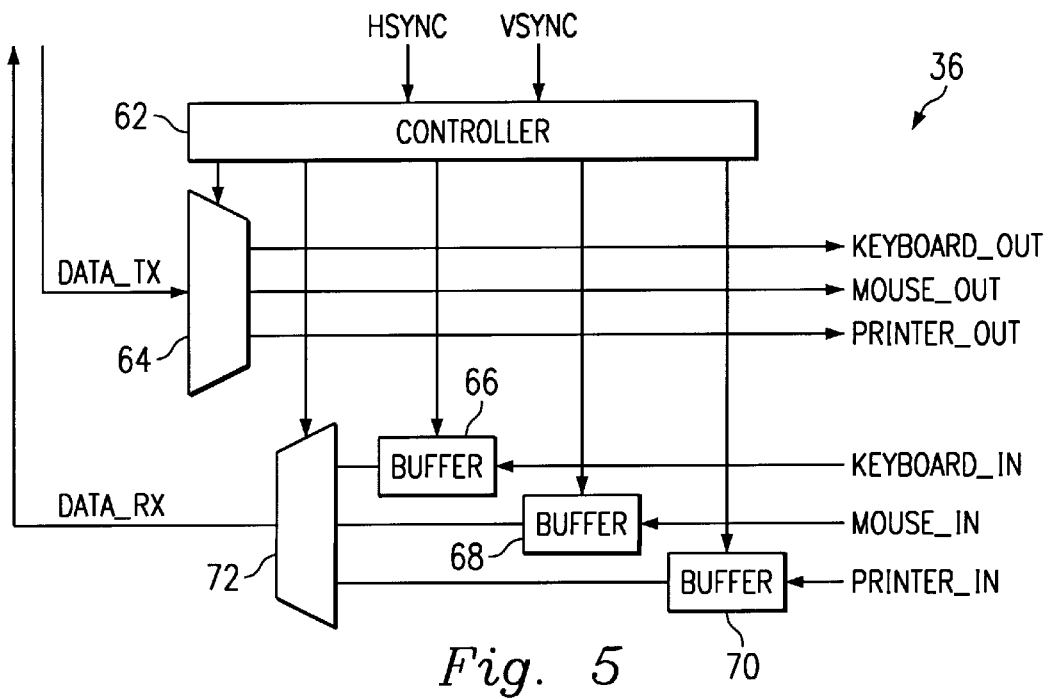
FIG. 5 is an expanded block diagram of a data decoder/encoder circuit of the downstream extension interface of FIG. 3.

Referring next to FIG. 5, the data decoder/encoder circuit 36 will now be described in greater detail. As may now be seen. the data decoder/encoder circuit 36 includes a controller 62 which receives the HSYNC and VSYNC signals from the 4-to-3 wire converter/video-data decoder circuit 34 and a 1:3 demultiplexer 64 having, as its data input, the DATA_TX line, a control input tied to an control output of the controller 62 and first, second and third data outputs— KEYBOARD_OUT, MOUSE_OUT and PRINTER_OUT—which are tied to the keyboard 18, the mouse 20 and the printer 22, respectively. The controller 62 separates keyboard, mouse and printer data from the combined DATA_TX signal by instructing the demultiplexer 64 as to when the input signal should be propagated as the KEYBOARD_OUT, MOUSE_OUT and PRINTER_OUT signals, respectively. To do so, the controller 62 receives the HSYNC and VSYNC signals from the 4-to-3 wire converter/video-data decoder circuit 34. The controller 62 counts the blanking pulses contained in the HSYNC and VSYNC signals, and, during each such blanking pulse of the HSYNC and VSYNC signals, instructs the demultiplexer 64 to propagate that portion of the DATA_TX signal received by the demultiplexer 64 during that blanking pulse to be output from the demultiplexer on a selected one of the KEYBOARD_OUT, MOUSE_OUT or PRINTER_OUT lines. For example, during horizontal blanking pulses 1–25, the controller 64 may propagate data received from the DATA_TX line on the KEYBOARD_OUT line. During horizontal blanking pulses 26–50, the controller 64 may propagate data received from the DATA_TX line on the MOUSE_OUT line. Finally, during horizontal blanking pulses 51–640, the controller 64 may propagate data received from the DATA TX line on the PRINTER OUT line. As before, it is contemplated that the controller 62 performs the disclosed separation of the KEYBOARD_OUT, MOUSE_OUT and PRINTER_OUT signals from the combined DATA_TX signal by executing an algorithm set forth in microcode maintained and executed by the controller 62.

Heretofore, only the transmission of signals from the computing system 12 to the keyboard 18, the mouse 20 and the printer 22 which collectively are the I/O devices forming part of the human interface 14 as been described. As it is typically preferred that computer systems are configured for bidirectional exchanges between the computing system 12 and I/O devices such as the keyboard, mouse and printer and the I/O devices, it is desired that the DTE 6d disclosed herein enable the transmission of signals from the keyboard 18, the mouse 20 and the printer 22 to the computing system 12. Such a further enablement of the invention shall now be described in greater detail, again by referring to FIGS. 3, 4 and 5.

As may now be seen, signals output by the keyboard 18, the mouse 20 and the printer 22 are respectively transmitted along the KEYBOARD_IN, MOUSE_IN and PRINTER_IN lines to a respective buffer 66, 68 and 70. Each of the buffers 66, 68 and 70 have a control input tied to a respective control output of the controller 62 and an output tied to a corresponding input of 3:1 multiplexer 72. Similarly, the multiplexer 72 has a control input tied to a control output of the controller 62. As the operation of the data decoder/encoder circuit 36 in combining the KEYBOARD_IN, MOUSE_IN and PRINTER_IN signals into a combined data signal DATA_RX is identical to the operation of the data encoder/decoder circuit 32 in combining the KEYBOARD_OUT, MOUSE_OUT and PRINTER_OUT signals into the combined data signal DATA_TX, further description of the data decoder/encoder circuit 36 in generating the return path signal, hereafter referred to as the DATA_RX signal, is not deemed necessary. Similarly, as the data encoder/decoder circuit 32 includes a 1:3 demultiplexer 74 having an input which receives the DATA_RX signal, a control input tied to a control output of the controller 48 and first, second and third outputs on which KEYBOARD_IN, MOUSE_IN and PRINTER_IN signals are transmitted to the computing system and the data encoder/decoder circuit 32 separates the DATA RX signal into the KEYBOARD_IN, MOUSE_IN and PRINTER_IN signals in a manner identical to the operation of the data decoder/encoder circuit 36 in separating the KEYBOARD_OUT, MOUSE_OUT and PRINTER_OUT signals from the DATA_TX signal, further description of the data encoder/decoder circuit 32 in generating the KEYBOARD_IN, MOUSE_IN, and PRINTER_IN signals is also not deemed necessary.

Rather than directing the DATA_RX signal to the video-data decoder/4-to-3 wire converter, the DATA_RX signal is directed to a transmitter 76 which splits the DATA_RX line into two identical signals and directly injects the signal on each of lines 3 and 4 of the 4-wire cable 28 in differential mode. As the DATA_RX signal can only go high during the horizontal and/or vertical blanking pulses, data may be bi-directionally transferred between the computing system 12 and the I/O devices (the keyboard 18, the mouse 20 and the printer 22) without interfering with the video signal being transferred from the computing system 12 to the video monitor 16. Furthermore, the microcode contained in the controllers 48 and 62 may be readily modified to enable bidirectional transmissions. For example, other blanking pulses may be assigned to the KEYBOARD_IN, MOUSE_IN and PRINTER_IN signals. Alternately, the blanking pulses may be subdivided into "in" and "out" portions. For example, some of the horizontal blanking pulses 1–25 may be assigned to KEYBOARD_OUT while others of the horizontal blanking pulses 1–25 may be assigned to KEYBOARD_IN. By enabling the controllers 48 and 62 to distinguish between signals going from the I/O devices to the computing system 12 and signals going from the computing system 12 to the I/O devices, the controllers 48 and 62 can respectively instruct the multiplexers 74 and 64 to ignore signals received from the DATA_RX and DATA_TX lines if such data was received at times indicating that the data is intended to travel in the opposite direction.

As previously stated, the transmitter 76 places DATA_RX on both lines 3 and 4 of the 4-wire cable 28. Lines 3 and 4 are further coupled to inputs of receiver 78 which provides, as its output, the signal DATA_RX. By placing DATA_RX on both lines, noise on the lines may be detected as any differential between the signals respectively received on the lines 3 and 4, thereby providing noise immunization, as well as reduced EMI radiation levels, for transmissions along the lines 3 and 4.

Finally, referring again to FIG. 7, the outputs of the operational amplifiers U1a, U1b and U1c have ganged controls which adjust the frequency response of the system. These controls compensate for the DC and high frequency losses in the 4-wire cable 28 used to connect the upstream extension interface 24 with the downstream extension interface 26. In addition, these controls may be used enhance the image to the user's taste by providing a "tone" control for video in which the high frequency video energy may be boosted to restore edges and definition to the display. As this equalization can make edges easier for tired eyes to detect, and thus recognize, it is a user-adjustable control.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computer network, comprising:
a plurality of interconnected nodes, each one of said nodes having a DTE device coupled thereto and wherein said DTE device coupled to a first one of said nodes further comprises:
a computing system located at a first location;
a human interface located at a second location, said second location remotely located relative to said first location, said human interface comprised of a video monitor and an input/output ("I/O") device;
a first interface device coupled to said computing system;
a second interface device coupled to said video monitor and said I/O device of said human interface;
a transmission line coupling said first and second interface devices;
said first interface device receiving, from said computing system, a video signal to be transmitted to said video monitor and a non-video signal to be transmitted to said I/O device and combining said video signal and said non-video signal into a combined video/non-video signal having a format suitable for transmission to said second interface device;
said combined video/non-video signal being transmitted to said second interface device via said transmission line;
said second interface device receiving said combined video/non-video signal from said first interface device and separating said video signal and said non-video signal therefrom for respective propagation to said video monitor and said I/O device.

2. A computer network according to claim 1 wherein said transmission line coupling said first and second interface devices is a 4-wire cable.

3. A computer network according to claim 1 and further comprising a cable for interconnecting said plurality of nodes.

4. A computer network according to claim 1 wherein said cable is a thin wire coaxial cable.

5. A computer network according to claim 1 wherein said computing system further comprises a computer chassis and at least one computing system component housed in said computer chassis and coupled to said first interface device.

6. A computer network according to claim 1 wherein said first I/O device of said human interface further comprises either a printer, a keyboard, or a mouse coupled to said second interface device.

7. A computer network, comprising:
a plurality of interconnected nodes, each one of said nodes having a DTE device coupled thereto and wherein said DTE device coupled to a first one of said nodes further comprises:
a computing system located at a first location;
a human interface located at a second location, said second location remotely located relative to said first location, said human interface comprised of a video monitor and at least one input/output ("I/O") device;
a first encoder coupled to said computing system;
a first decoder coupled to said video monitor and said at least one I/O device;
a transmission line coupling said encoder and said decoder;
said first encoder receiving, from said computing system, a video signal to be transmitted to said video monitor and a non-video signal to be transmitted to said at least one I/O device and combining said video and said non-video signals into a first combined signal;

said first decoder receiving said first combined signal from said first encoder and separating said video and non-video signals therefrom for respective propagation to said video monitor and said at least one I/O device.

8. A computer network, comprising:

a plurality of interconnected nodes, each one of said nodes having a DTE device coupled thereto and wherein said DTE device coupled to a first one of said nodes further comprises:
  a computing system located at a first location;
  a human interface located at a second location, said second location remotely located relative to said first location, said human interface comprised of a video monitor and at least one input/output ("I/O") device;
  a first encoder coupled to said computing system;
  a first decoder coupled to said video monitor and said at least one I/O device; and
  a transmission line coupling said encoder and said decoder;
  said first encoder receiving, from said computing system, a video signal to be transmitted to said video monitor and a non-video signal to be transmitted to said at least one I/O device and combining said video and said non-video signals into a first combined signal;
  said first decoder receiving said first combined signal from said first encoder and separating said video and non-video signals therefrom for respective propagation to said video monitor and said at least one I/O device;
  wherein said human interface further comprises first, second and third I/O devices and wherein said computer network further comprises:
    a second encoder, coupled to said computing system and said first encoder, said second encoder receiving a first non-video signal to be transmitted to said first I/O device, a second non-video signal to be transmitted to said second I/O device and a third non-video signal to be transmitted to said third I/O device and combining said first, second and third non-video signals into said non-video signal received by said first encoder; and
    a second decoder, coupled to said first decoder and said first, second and third I/O devices, said second decoder receiving said non-video signal from said first decoder, separating said first, second and third non-video signals therefrom and transmitting said first, second and third non-video signals to said first, second and third I/O devices, respectively.

9. A computer network according to claim 8 wherein said first I/O device is a keyboard, said second I/O device is a mouse and said third I/O device is a printer.

10. A computer network according to claim 8 wherein said first encoder receives R, G, B, HSYNC and VSYNC video signals from said computing system and combines said R and HSYNC video signals into a second combined signal to be transmitted to said first decoder, combines said B and VSYNC video signals into a third combined signal to be transmitted to said first decoder and combines said G video signal and said non-video signal into said first combined signal.

11. A computer network according to claim 10 wherein said first encoder transmits said HSYNC and VSYNC video signals to said second encoder, said second encoder using said HSYNC and VSYNC video signals to time combining said first, second and third non-video signals into said non-video signal.

12. A computer network according to claim 11 wherein said first decoder transmits said HSYNC and VSYNC video signals to said second decoder, said second decoder using said HSYNC and VSYNC video signals to time separating said non-video signal into said first, second and third non-video signals.

13. A computer network, comprising:

a plurality of nodes, each one of said nodes having a DTE device coupled thereto; and
a connective structure for interconnecting said DTE devices respectively coupled to said plurality of nodes into a computer network;
said DTE device coupled to a first one of said nodes further comprising:
  a computing system located at a first location;
  a human interface located at a second location, said second location remotely located relative to said first location, said human interface comprised of a video monitor and an input/output ("I/O") device;
  a first interface device coupled to said computing system, said first interface device including an encoding circuit;
  a second interface device coupled to said monitor and said I/O device, said second interface device including a decoding circuit; and
  a 4-wire cable coupling said first and second interface devices, said 4-wire cable being comprised of first, second, third and fourth transmission lines;
  said encoding circuit receiving, from said computing system, plural video signals to be transmitted to said video monitor and a non-video output signal to be transmitted to said I/O device, combining said non-video signal with a selected one of said plural video signals to produce a combined signal and transmitting said combined signal over a selected pair of said first, second, third and fourth transmission lines of said 4-wire cable;
  said decoding circuit receiving said combined signal from said first interface device and separating said combined signal into said video signal for transmission to said video monitor and said non-video signal for transmission to said I/O device.

14. A computer network according to claim 13 wherein said second interface device further comprises:
  an encoding circuit having an input coupled to said I/O device and an output coupled to said selected pair of said transmission lines;
  said encoding circuit encoding a non-video input signal, received from said I/O device, for transmission to said computing system over said selected pair of transmission lines.

15. A computer network according to claim 14 wherein said first interface device further comprises:
  a decoding circuit having first and second inputs coupled to respective ones of said selected pair of said transmission lines and an output coupled to said computing system;
  said decoding circuit decoding said non-video input signal received from said encoding circuit of said second interface device for transmission to said computing system.

16. A computer network having commonly located computing systems, comprising:
  a plurality of nodes, each one of said nodes having a DTE device coupled thereto; and a connective structure for interconnecting said DTE devices respectively located at said plurality of nodes into a computer network;

wherein at least two of said nodes are positioned at a common location and wherein said DTE device coupled to each one of said at least two nodes positioned at said common location further comprises:

a computing system located at said common location;

a human interface located at a second location, said second location remotely located relative to said common location, said human interface comprised of a video monitor and an input/output ("I/O") device;

a first interface device coupled to said computing system;

a second interface device coupled to said video monitor and said I/O device;

a transmission line coupling said first interface device and said second interface device;

said first interface device converting a video signal to be transmitted to said video monitor and a non-video signal to be transmitted to said I/O device into a combined signal having a format suitable for transmission to said second interface device over said transmission line and said second interface re-converting said combined signal having said format, received from said first interface device over said transmission line, into said video signal and said non-video signal for respective propagation to said video monitor and said I/O device.

17. A computer network according to claim 16 wherein said computing systems respectively coupled to each one of said at least two nodes are housed together in a shared computer room.

18. A computer network according to claim 16 wherein said computing systems respectively coupled to each one of said at least two nodes are housed together in a common support structure located in a shared computer room.

19. A computer network according to claim 18 wherein said common support structure is a computer rack.

20. A computer network according to claim 19 wherein said second location at which said human interface for said computing system coupled to a first one of said at least two nodes is also remotely located relative to said second location at which said human interface for said computing system coupled to a second one of said at least two nodes is located.

21. A computer network having commonly located computing systems, comprising:

a plurality of nodes, each one of said nodes having a DTE device coupled thereto; and a connective structure for interconnecting said DTE devices respectively located at said plurality of nodes into a computer network;

wherein at least two of said nodes are positioned at a common location and wherein said DTE device coupled to each one of said at least two nodes positioned at said common location further comprises:

a computing system located at said common location;

a human interface located at a second location, said second location remotely located relative to said common location, said human interface comprised of a video monitor and at least one input/output ("I/O") device;

a first encoder coupled to said computing system;

a first decoder coupled to said video monitor and said at least one I/O device;

a transmission line coupling said encoder and said decoder;

said first encoder receiving, from said computing system, a video signal to be transmitted to said video monitor and a non-video signal to be transmitted to said at least one I/O device and combining said video and said non-video signals into a first combined signal;

said first decoder receiving said first combined signal from said first encoder and separating said video and non-video signals therefrom for respective propagation to said video monitor and said at least one I/O device.

22. A computer network according to claim 21 wherein said connective structure is arranged in a bus topology.

23. A computer network according to claim 21 wherein said second location at which said human interface for said computing system coupled to a first one of said at least two nodes is also remotely located relative to said second location at which said human interface for said computing system coupled to a second one of said at least two nodes is located.

24. A computer network according to claim 21 wherein said computing systems respectively coupled to each one of said at least two nodes are housed together in a shared computer room.

25. A computer network according to claim 21 wherein said computing systems respectively coupled to each one of said at least two nodes are housed together in a common support structure located in a shared computer room.

26. A computer network according to claim 25 wherein said common support structure is a computer rack.

27. A computer network having commonly located computing systems, comprising:

a plurality of nodes, each one of said nodes having a DTE device coupled thereto; and a connective structure for interconnecting said DTE devices respectively located at said plurality of nodes into a computer network;

wherein at least two of said nodes are positioned at a common location and wherein said DTE device coupled to each one of said at least two nodes positioned at said common location further comprises:

a computing system located at said common location;

a human interface located at a second location, said second location remotely located relative to said common location, said human interface comprised of a video monitor and at least one input/output ("I/O") device;

a first encoder coupled to said computing system;

a first decoder coupled to said video monitor and said at least one I/O device;

a transmission line coupling said encoder and said decoder;

said first encoder receiving, from said computing system, a video signal to be transmitted to said video monitor and a non-video signal to be transmitted to said at least one I/O device and combining said video and said non-video signals into a first combined signal;

said first decoder receiving said first combined signal from said first encoder and separating said video and non-video signals therefrom for respective propagation to said video monitor and said at least one I/O device;

wherein said human interface of said DTE device coupled to each one of said at least two nodes further comprises first, second and third I/O devices and wherein said DTE device coupled to each one of said at least two nodes further comprises:

a second encoder, coupled to said computing system and said first encoder, said second encoder receiving a first non-video signal to be transmitted to said first I/O device, a second non-video signal to be transmitted to said second I/O device and a third non-video signal to be transmitted to said third I/O device and combining said first, second and third non-video signals into said non-video signal received by said first encoder; and a second decoder, coupled to said first decoder and said first, second and third I/O devices, said second decoder receiving said non-video signal from said first decoder, separating said first, second and third non-video signals therefrom and transmitting said first, second and third non-video signals to said first, second and third I/O devices, respectively.

28. A computer network according to claim 27 wherein said first I/O device is a keyboard, said second I/O device is a mouse and said third I/O device is a printer.

29. A computer network according to claim 27 wherein said first encoder receives R, G, B, HSYNC and VSYNC video signals from said computing system and combines said R and HSYNC video signals into a second combined signal to be transmitted to said first decoder, combines said B and VSYNC video signals into a third combined signal to be transmitted to said first decoder and combines said G video signal and said non-video signal into said first combined signal.

30. A computer network, comprising:

a first computing system located at a first location;

a first human interface located at a second location, said second location remotely located relative to said first location, said first human interface comprised of a video monitor and an input/output device;

a first interface device coupled to said first computing system, said first interface device including an encoding circuit;

a second interface device coupled to said monitor and said input/output device of said first human interface, said second interface device including a decoding circuit;

a 4-wire cable coupling said first and second interface devices, said 4-wire cable coupling said first and second interface devices being comprised of first, second, third and fourth transmission lines;

said encoding circuit of said first interface device receiving, from said first computing system, a first set of plural video signals to be transmitted to said video monitor of said first human interface and a first non-video output signal to be transmitted to said input/output device of said first human interface, combining said first non-video signal with a selected one of said first set of plural video signals to produce a first combined signal and transmitting said first combined signal over a selected pair of said first, second, third and fourth transmission lines of said 4-wire cable coupling said first and second interface devices;

said decoding circuit of said second interface device receiving said first combined signal from said first interface device and separating said first combined signal into said selected one of said first set of plural video signals for transmission to said video monitor of said first human interface and said first non-video signal for transmission to said input/output device of said first human interface;

a second computing system commonly located at said first location with said first computing system;

a second human interface located at a third location, said third location remotely located relative to said first location and to said second location, said second human interface comprised of a video monitor and an input/output device;

a third interface device coupled to said second computing system, said third interface device including an encoding circuit;

a fourth interface device coupled to said monitor and said input/output device of said second human interface, said fourth interface device including a decoding circuit;

a 4-wire cable coupling said third and fourth interface devices, said 4-wire cable coupling said third and fourth interface devices being comprised of first, second, third and fourth transmission lines;

said encoding circuit of said third interface device receiving, from said second computing system, a second set of plural video signals to be transmitted to said video monitor of said second human interface and a second non-video output signal to be transmitted to said input/output device of said second human interface, combining said second non-video signal with a selected one of said second set of plural video signals to produce a second combined signal and transmitting said second combined signal over a selected pair of said first, second, third and fourth transmission lines of said 4-wire cable coupling said third and fourth interface devices;

said decoding circuit of said fourth interface device receiving said second combined signal from said third interface device and separating said second combined signal into said selected one of said second set of video signals for transmission to said video monitor of said second human interface and said second non-video signal for transmission to said input/output device of said second human interface; and a connective structure for interconnecting said first computing system and said second computing system into a computer network.

31. A computer network according to claim 30 wherein said second interface device further comprises:

an encoding circuit having an input coupled to said I/O device of said first human interface and an output coupled to said selected pair of said transmission lines of said first 4-wire cable;

said encoding circuit of said second interface device encoding a first non-video input signal, received from said I/O device of said first human interface, for transmission to said first computing system over said selected pair of transmission lines of said first 4-wire cable; and wherein said fourth interface device further comprises:

an encoding circuit having an input coupled to said I/O device of said second human interface and an output coupled to said selected pair of said transmission lines of said second 4-wire cable;

said encoding circuit of said fourth interface device encoding a second non-video input signal, received from said I/O device of said second human interface, for transmission to said second computing system over said selected pair of transmission lines of said second 4-wire cable.

32. A computer network according to claim 31 wherein said first interface device further comprises:

a decoding circuit having first and second inputs coupled to respective ones of said selected pair of said transmission lines of said first 4-wire cable and an output coupled to said first computing system;

said decoding circuit of said first interface device decoding said first non-video input signal received from said encoding circuit of said second interface device for transmission to said first computing system; and wherein said third interface device further comprises:
a decoding circuit having first and second inputs coupled to respective ones of said selected pair of said transmission lines of said second 4-wire cable and an output coupled to said second computing system;

said decoding circuit of said third interface device decoding said second non-video input signal received from said encoding circuit of said fourth interface device for transmission to said second computing system.

33. A computer network, comprising:

a plurality of interconnected nodes, each one of said nodes having a DTE device coupled thereto and wherein said DTE device coupled to a first one of said nodes further comprises:

a computing system located at a first location;

a human interface located at a second location, said second location remotely located relative to said first location, said human interface comprised of a video monitor and an input/output ("I/O") device;

a first interface device coupled to said computing system;

a second interface device coupled to said video monitor and said I/O device of said human interface;

a transmission line coupling said first and second interface devices;

said first interface device receiving, from said computing system, at least two video signals to be transmitted to said video monitor and a non-video signal to be transmitted to said I/O device and combining said non-video signal and a selected one of said at least two video signals into a combined video/non-video signal;

said combined video/non-video signal and unselected ones of said at least two video signals being transmitted to said second interface device via said transmission line;

said second interface device receiving said combined video/non-video signal from said first interface device, separating said selected video signal and said non-video signal from said combined video/non-video signal, propagating said selected video signal and said unselected ones of said at least two video signals to said video monitor and propagating said non-video signal to said I/O device.

34. A computer network, comprising:

a plurality of interconnected nodes, each one of said nodes having a DTE device coupled thereto and wherein said DTE device coupled to a first one of said nodes further comprises:

a computing system located at a first location;

a human interface located at a second location, said second location remotely located relative to said first location, said human interface comprised of a video monitor, a first input/output ("I/O") device and a second I/O device;

a first interface device coupled to said computing system;

a second interface device coupled to said video monitor, said first I/O device and said second I/O device;

a transmission line coupling said first and second interface devices;

said first interface device receiving, from said computing system, a video signal to be transmitted to said video monitor, a first non-video signal to be transmitted to said first I/O device and a second non-video signal to be transmitted to said second I/O device, said first interface combining said first non-video signal and said second non-video signal to produce a combined non-video signal and combining said video signal and said combined non-video signal to produce a combined video/non-video signal;

said combined video/non-video signal being transmitted to said second interface device via said transmission line;

said second interface device receiving said combined video/non-video signal from said first interface device, separating said video signal and said combined non-video signal from said combined video/non-video signal, separating said first non-video signal and said second non-video signal from said combined non-video signal from said combined non-video signal, propagating said video signal to said video monitor, propagating said first non-video signal to said first I/O device and propagating said second non-video signal to said second I/O device.

35. A computer network, comprising:

a plurality of nodes, each one of said nodes having a DTE device coupled thereto; and a connective structure for interconnecting said DTE devices respectively coupled to said plurality of nodes into a computer network;

said DTE device coupled to a first one of said nodes further comprising:

a computing system located at a first location;

a human interface located at a second location, said second location remotely located relative to said first location, said human interface comprised of a video monitor and an input/output ("I/O") device;

a first interface device coupled to said computing system;

a second interface device coupled to said monitor and said I/O device; and a cable coupling said first and second interface devices, said cable being comprised of a plurality of transmission lines;

said first interface device receiving, from said computing system, a video signal to be transmitted to said video monitor and a non-video signal to be transmitted to said I/O device, combining said video signal and said non-video signal to produce a combined video/non-video signal and transmitting said combined video/non-video signal over a selected pair of said plurality of transmission lines of said cable;

said second interface device receiving said combined video/non-video signal from said first interface device over said selected pair of said plurality of transmission line and separating said combined video/non-video signal into said video signal for transmission to said video monitor and said non-video signal for transmission to said I/O device.

* * * * *

(12) EX PARTE REEXAMINATION CERTIFICATE (9775th)
United States Patent
Heller et al.

(10) Number: US 6,012,101 C1
(45) Certificate Issued: Jul. 30, 2013

(54) COMPUTER NETWORK HAVING COMMONLY LOCATED COMPUTING SYSTEMS

(75) Inventors: Andrew Heller, Austin, TX (US); Daniel Barrett, Austin, TX (US); Charles Ely, Horseshoe Bay, TX (US)

(73) Assignee: Clearcube Technology, Inc., Austin, TX (US)

Reexamination Request:
No. 90/012,706, Oct. 18, 2012

Reexamination Certificate for:
Patent No.: 6,012,101
Issued: Jan. 4, 2000
Appl. No.: 09/072,397
Filed: May 4, 1998

Related U.S. Application Data

(60) Provisional application No. 60/071,604, filed on Jan. 16, 1998.

(51) Int. Cl.
*H04L 29/06* (2006.01)

(52) U.S. Cl.
USPC .......................................... 709/250; 709/246

(58) Field of Classification Search
None
See application file for complete search history.

(56) References Cited

To view the complete listing of prior art documents cited during the proceeding for Reexamination Control Number 90/012,706, please refer to the USPTO's public Patent Application Information Retrieval (PAIR) system under the Display References tab.

*Primary Examiner* — Jason Proctor

(57) ABSTRACT

A computer network comprised of a plurality of interconnected nodes, each having a DTE device coupled thereto. Plural ones of the DTE devices are each further comprised of a computing system positioned at a first location and a human interface, which includes a video monitor, and plural I/O devices, specifically, a keyboard, mouse and printer, positioned at a second location remotely located relative to the first location. The first locations at which the computing systems of the DTE devices are positioned are commonly located. The DTE devices further include a first encoder coupled to the computing system, a first decoder coupled to the video monitor and the at least one I/O device and a transmission line which couples the encoder to the decoder. The first encoder receives, from the computing system, a video signal to be transmitted to the video monitor and a non-video signal to be transmitted to the at least one I/O device. The first encoder combines the video and the non-video signals into a combined signal and transmits the combined signal to the first decoder via the transmission line. The first decoder receives the combined signal, separates the video and non-video signals therefrom for respective propagation to the video monitor and the at least one I/O device.

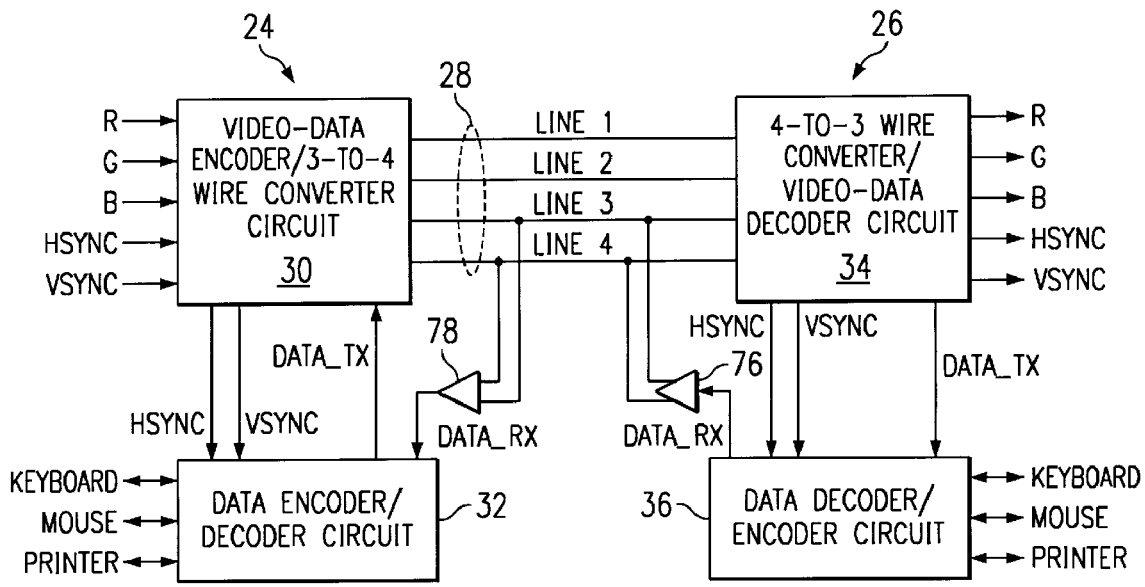

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 5-7 are cancelled.

Claims 2-4 and 8-35 were not reexamined.

\* \* \* \* \*